May 30, 1944.   G. KENDE ET AL   2,350,237
PHOTOGRAPHIC APPARATUS
Filed Dec. 18, 1941
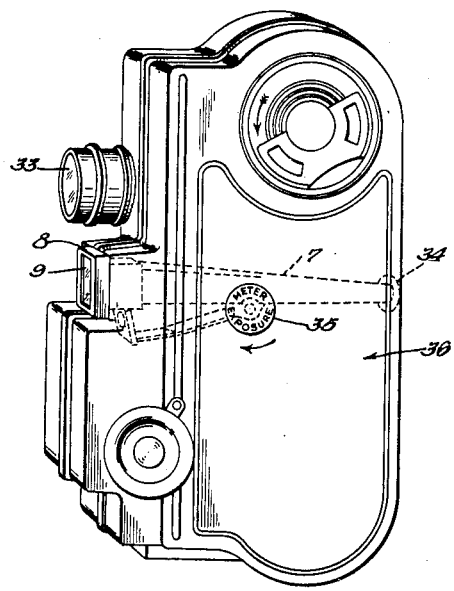
FIG.1.
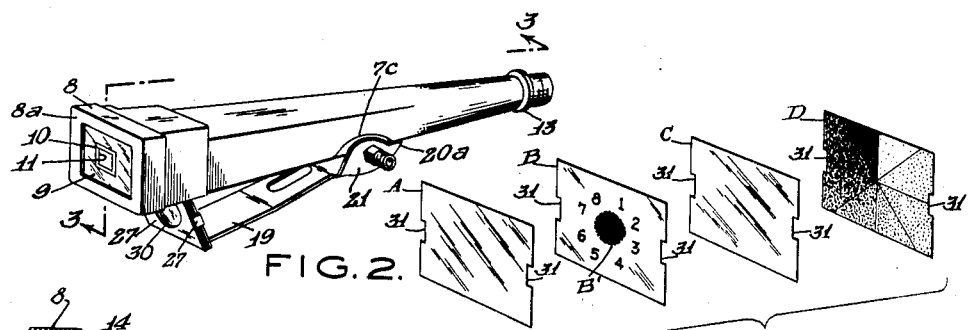
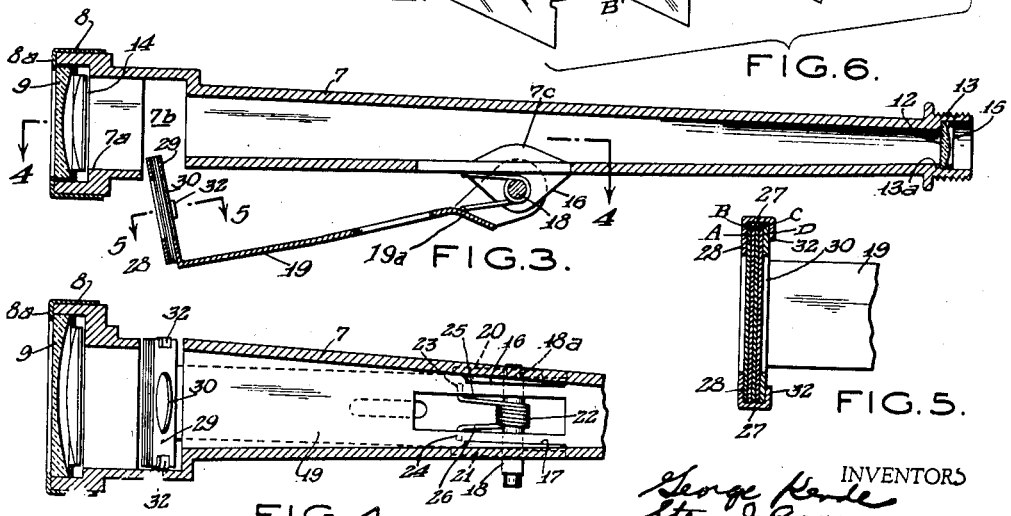
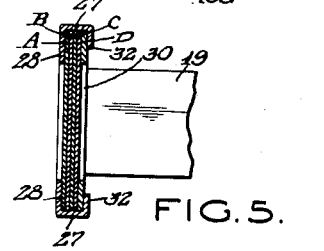
INVENTORS
George Kende
Sten Johansson
BY
ATTORNEY Patented May 30, 1944

2,350,237

UNITED STATES PATENT OFFICE 2,350,237

PHOTOGRAPHIC APPARATUS

George Kende, Dobbs Ferry, and Sten Johanson, New York, N. Y., assignors to Universal Camera Corporation, New York, N. Y., a corporation of New York Application December 18, 1941, Serial No. 423,436

5 Claims. (Cl. 95—10)

This invention relates generally to photographic apparatus, especially cameras of the still and motion picture types, and is more particularly directed to a combined view finder and exposure meter, so constituted that it may be incorporated in a camera as a part of the structure thereof, to enable the camera user to meter an exposure as a part of the operation of framing the subject in the view finder.

For the purposes of this disclosure, we have elected to set forth our invention, as it may be practiced in the construction and operation of a motion picture camera, such as is customarily used by the non-professional or amateur photographer. However, this is merely illustrative and is not to be construed as a limitation of the scope of utility of the invention, which may be advantageously employed in cameras of other forms, whether of the so-called still or motion picture types.

As is well known, it is the general practice to measure the light intensity by a so-called light meter, to obtain an indication of camera adjustments which must be made to attain the best results under the prevailing light and other contributing conditions.

The conventional light meters, the construction of which is well known in the art, are universally designed for measuring the light intensity in one way or another as, for instance, by a brightness value reading through a light wedge, having areas of gradual, decreasing translucency as the light passageway meter is held either directly against or at an appreciable distance from the eye. While this method of measuring may indicate the general light intensity surrounding the meter, which is held a distance from the subject, it does not insure accuracy in determining the immediate light intensity surrounding the subject, nor does it compensate for the variations in light intensity values reflected by the subject through the taking lens of the camera, as against the light values measured at the meter, so that at best, only a rough approximation of the true light intensity at the subject is ascertainable.

The primary object of this invention is to provide a combined view finder and light or exposure meter, which may be incorporated in the structure of a camera of any type to which it may be applicable, thereby making it possible for the camera user to meter the light intensity of the subject to be photographed, as the subject is framed or centered within the view finder, virtually making the framing and metering a single operation. By this means, the image of the subject may be concentrated with a maximum of acuity upon the metering elements, the latter being movable at will to a position in association with the finder lens, for observation from the sight opening of the view finder.

Another important object of our invention is to insure greater accuracy in determining the correct exposure required for a given subject, by providing a fixed relationship between the taking lens of a camera and an exposure meter, the same as obtains between such lens and the viewing lens of the finder in which the image of the subject is framed or centered, prior to photographing, whereby the intensity of the light of the subject at the precise angle at which it is to be photographed may be measured, instead of the light conditions generally surrounding the subject or the camera, as with the conventional metering devices.

Our invention also contemplates a composite screen or exposure metering means, made up of a series of screens or screen sections, associated for movement into and out of functioning position, at the will of the camera operator and coincidental with the framing of the subject in the view finder, or otherwise, the screen-forming elements of sections having individual characteristics of permeability to light, whereby they coact in metering the light rays transmitted thereto to indicate by a sharply defined number or other symbol a predetermined degree of light intensity at the subject, for which the appropriate camera adjustments must be made, to obtain the most efficient results in the photographing of such subject, irrespective of its distance from or its angular relation with respect to the camera.

Other objects and advantages flowing from the practicing of our invention, will present themselves as the description proceeds and we would have it understood that we reserve all rights thereto, within the purview of the appended claims.

For the purposes of this disclosure, we have elected to illustrate and describe a preferred embodiment of the invention, as it is now practiced in the production and operation of a motion picture camera of the type employing 8 mm. film, designed for non-professional or amateur use. Our invention may take other forms, however, and may be applied to cameras of other forms, as used in taking still or motion pictures, in the attainment of the objectives to which the invention is directed, as hereinbefore set forth.

In the drawing:

Figure 1 is a view in perspective of a motion picture camera, in the structure of which our combined view finder and exposure meter is incorporated.

Figure 2 is a perspective of the combined view finder and exposure meter, the latter being in non-functioning position.

Figure 3 is a longitudinal section on the line 3—3 of Figure 2.

Figure 4 is a transverse section, on the line 4—4 of Figure 3.

Figure 5 is a cross-sectional view of the exposure meter screen assembly, taken on the line 5—5 of Figure 3; and Figure 6 is an exploded view, in perspective, of the components of the composite light measuring screen of the exposure meter assembly.

Referring now to the drawing in detail, in which like characters of reference are employed to designate similar parts in the several views, our combined view finder and exposure meter includes a housing 7, preferably of the elongated tapering configuration shown, one end thereof being of a rectangular stepped shape, within which is supported the usual field objective or viewing lens 9, having etched thereon two rectangular frames 10 and 11, one within the other, to facilitate the centering or so-called framing of the photographic subject, the image of which is projected through the eye-piece lens 12 in the annular eye-piece 13 at the opposite end of said housing 7. The viewing lens 9, in the present embodiment, is rigidly held in position within the housing, between the flange 8a of the cap 8, complemental to the housing 7, and the cooperating rectangularly shaped spring member 14, interposed between the back of the lens and the internal shoulder 7a of the housing, the eye-piece lens 12 being held in position against the shoulder 13a of the eye-piece by the retaining ring 15.

At a point intermediate its ends, the housing is provided with dependent lugs 16 and 17, apertured to form bearings for the shaft 18, disposed transversely of the bottom wall of the housing, on which is mounted the exposure meter carriage, for actuation relatively to said housing into and out of functioning position, as hereinafter described.

The aforesaid carriage, which may be formed of sheet metal, includes an elongated strip-like body-portion 19, provided at one end with laterally spaced upstanding ears or projections 20 and 21, apertured for engagement with said shaft 18, whereby said carriage will be supported therefrom for rotative movement therewith. In the present showing, the shaft and carriage are interlocked for conjoint arcuate movement, by the interengagement of the squared end 18a of the shaft with a complemental aperture in the ear or projection 20, the aperture in the other ear 21, conforming to the peripheral contour of the shaft. Of course, both of said ears may be provided with squared or other appropriately shaped holes to embrace cooperating surfaces provided on the shaft to attain the desired end, or the carriage may be otherwise keyed to said shaft.

At its opposite end, the said body-portion 19 carries suitable means, disposed at an angle of approximately 90° thereto, for supporting a composite light measuring screen, or so-called exposure meter, which consists of a series of rectangular translucent screens of varying light permeability, of corresponding area, assembled in predetermined superimposed association within such supporting means. This composite screen, the components of which are indicated at a, b, c and d in Figure 6, is optionally disposable within the field of the lens 9, in response to the hinged movement of said carriage toward the adjacent wall of the housing by the rotation of said shaft 18, in opposition to the coil spring 22, mounted thereon, with the offset ends 23 and 24 of its arms 25 and 26 in bearing engagement with the opposed surfaces of said housing and carriage respectively, as shown in Figure 4.

As will be observed, a part of the defining wall of the housing in juxtaposition to the lens 9 is interrupted or cut away to provide a passage 7b for the entry of said screen supporting means into the housing, when the carriage is actuated to its extreme position in opposition to said spring 22, this disposition of the carriage locating said light measuring screen parallel to the plane of the lens 9, the body-portion of the carriage being substantially parallel to the wall of the housing from which it is supported. To attain the requisite range of movement of the carriage, as just described, the body-portion thereof, in proximity to the ears 20 and 21, may be angularly offset, as at 19a, the carriage being connected to the shaft 18, preferably externally of the dependent lugs 16 and 17, the side walls of the housing being recessed, as at 7c to afford clearance for the movement of the carriage supporting media fixed to said shaft. Any suitable means may be utilized to limit the movement of the carriage under the influence of the spring 22, to its other extreme position, as by the formation of a stop 20a on one or both of said ears 20 and 21, adapted to abut upon the defining surface of the recess 7c.

The screen-supporting means may be of an appropriate design and integral with the body-portion of the carriage, or separately formed and fixed thereto, such means, as herein shown, embodying a base and side members 27, flanged as at 28, the spaced flanges 28 forming a frontal support for the components of the light measuring screen, assembled therein in association with an opaque mask 29 of metal, glass or Celluloid, or other suitable material, of an area corresponding to that of the screen components A, B, C and D, which forms the rear surface of the light metering assembly, and which is provided with an annular sight opening 30. To maintain the exposure meter elements in registering relationship, in engagement with said supporting flanges 28, the side members of said supporting means may embody integral detents 32, adapted for interlocking engagement with the notches 31, provided in the parallel side edges of the respective screen sections A, B, C and D, and the mask 29, as shown in Figure 4.

The components of the aforementioned light measuring screen, mounted in the screen supporting of the carriage hinged to the view finder housing 7, are four in number, comprising the rectangular screens or screen sections A, B, C and D, as pointed out, which may be of Celluloid, glass, or other suitable material, treated to possess the characteristics requisite to the practicing of the invention.

As explained, these screen sections are arranged in superimposed association within the screen supporting means, the section A, which is positioned next the frontal supporting flanges 28, being translucent, with a light permeability corresponding to that of ground glass, while the second screen B, likewise translucent, embodies a centrally located black or opaque annular area, as at B', which is surrounded in radially spaced relation by numbers from one to eight, or other suitable indicia, as is clearly shown in Figure 6. Screen section C, which may be termed the neutral clarity filter, is transparent, the fourth section D being divided into a plurality of segments, forming areas of gradually diminishing translucency, and functioning as a light wedge, the four sections being assembled in the screen support in the order recited, with the apertured mask 29 in association with the rear surface of the screen section D, to form the back of the light measuring unit assembly.

The combined view finder and exposure meter, assembled as described is mounted in the camera case or housing 36 for disposition transversely of the motor chamber, as shown in Figure 1, the length of the finder housing 7, being such that the lens 9 is disposed in the plane of the camera or photographic lens 33, the eye-piece 13 being aligned with an opening in the rear wall of the camera housing for threaded reception of a cap 34 provided with a sight opening for viewing the image on the lens 12. The shaft 18 protrudes through an opening provided in the side wall of the camera housing for the reception of an actuator knob or finger-piece 35 which may be fixed to said shaft, through the medium of cooperating squared or other surfaces and a set screw, or in any other manner suitable to render the carriage for the light measuring screen movable into the field of the lens 9, as described, and retaining it in such position while the correct meter reading is obtained.

As will be evident, a meter reading may be made as a step in the framing of the photographic subject in the view finder, thereby assuring greater accuracy in determining the immediate light intensity of the subject, instead of a more or less general indication of the light conditions surrounding the subject, as is the case in the use of the conventional exposure meters.

In obtaining a meter reading, or measuring the light intensity at the photographic subject, the aforesaid knob or finger-piece is grasped and rotated in the direction of the arrow, or clockwise, as the subject is framed or centered, as the case may be, in one or the other of the two rectangles on the lens 9, until the light measuring screen (composed of the sections A, B, C and D) is positioned within the finder housing 7, parallel to the lens 9, as previously described. As the meter is viewed from the eye-piece 13, with the camera directed toward the subject, as in framing, the light rays transmitted to the screen will appear in varying intensity, and, as the eye becomes accustomed to the light variation, the acuity of vision will increase, until one of the numbers will appear to stand out with greater clarity and definition, than the others, some of which may be indistinctly discernible, it being manifest that the black area B' of the screen section B will effectively blot out the projection of an image of the subject to the eye-piece lens 12, so that the surrounding area of the screen only is visible to the observer. The highest number or indicia which appears sharply and clearly defined, functions as the key for use in calculating the exposure. This, of course, is accomplished by any suitable means, as a separate operation, or as a series of steps of a single operation, including the lens setting and all of those factors which must be taken into consideration in making a photographic exposure, as the season of the year, type of subject, weather conditions, time of day and film rating.

On completion of the meter reading, the carriage actuator knob is released, permitting the latter to move under the influence of the spring 22 to locate the light measuring screen in non-functioning position, below the finder housing, as set forth. The framing of the subject may now be verified, if desired, before making the requisite camera settings prior to operating the camera, to photograph the subject.

While we have described our invention more or less specifically, relative to the embodiment shown, it will be manifest that the finder housing may take other forms and that the light screen may be otherwise assembled and variously supported for movement into and out of functioning position, relatively to the viewing lens of the finder; also, that our combined view finder and exposure meter may be advantageously incorporated in various forms of cameras of the so-called still or motion picture types, within the scope and spirit of this disclosure.

We claim:

1. In combination with a view finder for photographic cameras having an object lens at one end and an eye-piece embodying an observation lens at its opposite end of an exposure meter, said meter consisting of a composite screen comprising a blank of translucent material, a second blank of translucent material having a centrally located circular opaque spot superimposed on said first blank, a transparent blank and indicia surrounding said spot in equidistantly spaced relation, said second blank being superimposed upon said first blank, a third blank of transparent material superimposed upon said second blank and a fourth blank divided into a series of triangular sections of graduated permeability to light rays superimposed upon said third blank, a support for said screen hinged to said view finder for relative movement and means for fixing said composite screen to said support with said uniformly translucent blank disposed toward the object lens end of the view finder, said support being actuatable relative to said view finder to locate said screen in parallel concealing relation to said object lens for viewing from said eye-piece of said view finder in a light measuring step of the operation of a photographic camera.

2. A view finder for a camera including a housing defining a light passage, an object lens mounted at one end of said passage, an observation lens mounted at the opposite end thereof for viewing an image projected thereto by said object lens, an exposure meter embodying a composite screen comprising a blank of translucent material, a second blank of translucent material superimposed upon said first blank and having a central opaque spot and a plurality of symbols surrounding said spot, a third blank of transparent material superimposed upon said second blank, and a fourth blank divided into a series of sections of varying light permeability superimposed upon said third blank, manually operable means for actuating said exposure meter to locate said screen in said light passage in juxtaposition to said object lens to measure the light intensity of an object framed in said object lens, the light value of the object being indicated in a sharp definition of one of said symbols, in contrast to others, as the measuring screen is observed through said observation lens, and means for automatically displacing said screen from within said light passage upon completion of the light measurement.

3. The combination with a photographic camera, including a housing and a photographic lens mounted thereon, of a view finder embodying a light passage, an object lens mounted at one end of said passage, the other end thereof having an eye-piece including a lens, said view finder being mounted within said camera housing with the object lens thereof disposed outwardly of said housing in fixed relation to the photographic lens of the camera, a device hinged to said view finder for relative movement within said camera housing, said device carrying a light measuring screen comprising a pair of discs of translucent material, one of said discs having a centrally located opaque area and indicia surrounding said area in radially spaced relation thereto, a transparent disc and a disc of uniform thickness divided into a series of sections of graduated light permeability, and means external of said camera housing for actuating said device to enter said light measuring screen in said light passage for determining the light value of an object upon which the object lens of said finder is focused, said screen being observable solely through the eye-piece of said view finder.

4. A combined view finder and exposure meter for photographic cameras, including an elongated housing having an object lens mounted in one end thereof, said housing tapering toward the opposite end and terminating in an eye-piece provided with an observation lens, said housing defining a light passage for the projection of an image, upon which said object lens is focused, to said observation lens, a slot in said housing adjacent said object lens, an elongated member hinged at one end thereof to said housing and extending externally of this latter toward the object lens, a support carried by said member at an angle thereto, a light-measuring unit mounted on said support, said unit comprising a plurality of translucent elements fixedly assembled in superimposed relation to each other and embodying a series of sections of graduated light permeability and symbols readable against said sections, means for manually actuating said elongated member to move said support through said slot to locate said light-measuring unit in the light passage, and means between said housing and said member automatically operative to normally maintain said support and said light-measuring unit in a position externally of said light passage.

5. The combination with a photographic camera including a housing and a photographic lens mounted thereon, of a view-finder defining a light passage immovably mounted within said housing and having an object lens at one end thereof disposed in fixed relation to the photographic lens of the camera, the opposite end of said finder embodying an eye-piece provided with an observation lens, a member rockably mounted on said view-finder externally thereof for relative movement within the camera housing, a support carried by said member and normally located externally of said view-finder, a composite light-measuring screen rigid with said support comprising a plurality of translucent elements fixedly assembled in superimposed relation to each other, one of said elements being divided into a series of sections of graduated light permeability, and another of said elements being provided with symbols readable through said sections, means external of said housing connected to said member and manually operable to actuate said member to locate said screen support within said light passage for observation of the screen from said eye-piece, and means automatically effective on the release of said manually operable means to displace said screen support to its normal position externally of the light passage.

GEORGE KENDE.
STEN JOHANSON.